No. 656,375. Patented Aug. 21, 1900.
J. W. ROGERS.
VEHICLE BRAKE.
(Application filed May 9, 1900.)
(No Model.)
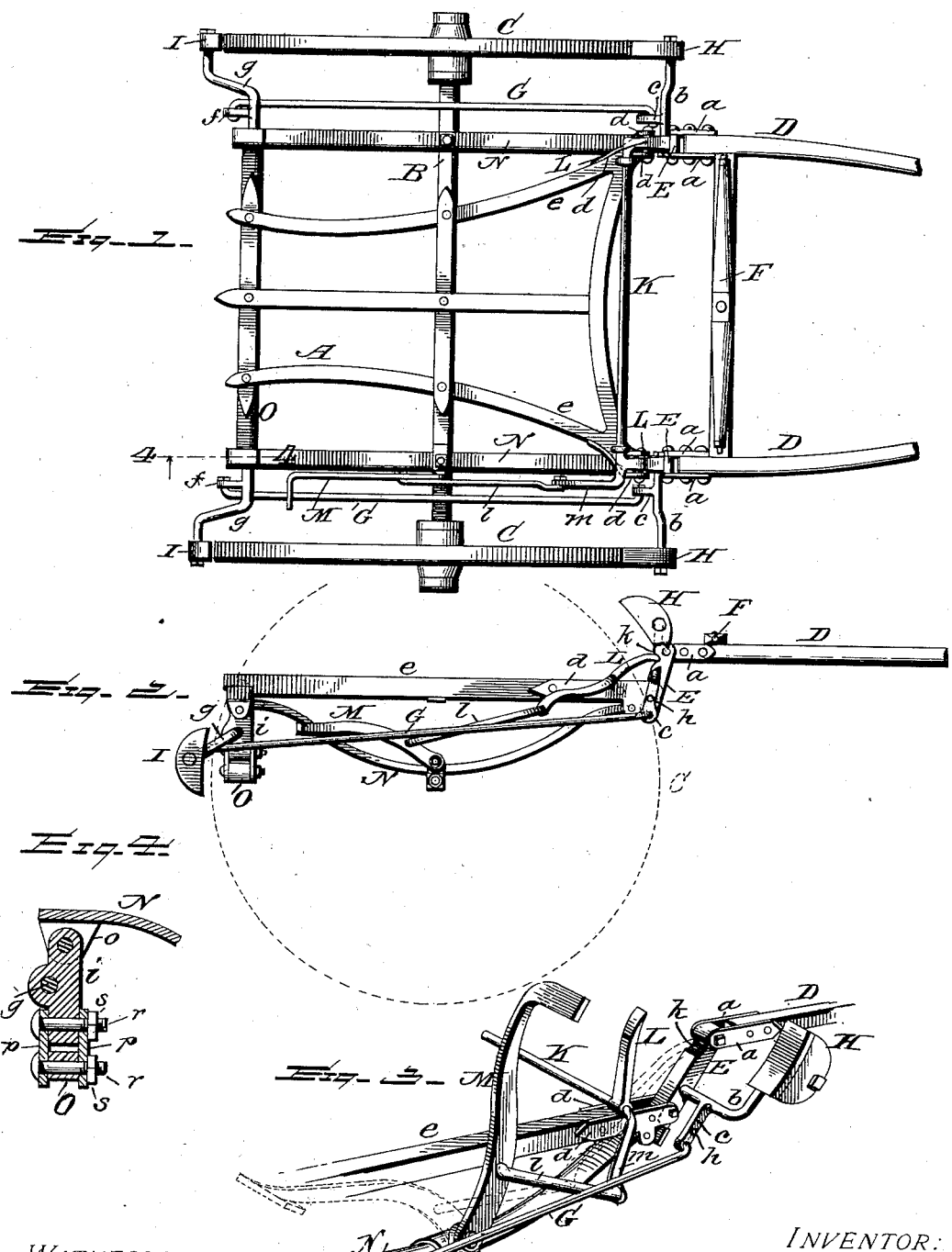
WITNESSES:
INVENTOR:
Joseph W. Rogers,
By Chas H. Fowler
Attorney

UNITED STATES PATENT OFFICE.

JOSEPH WAREN ROGERS, OF COLLOMSVILLE, PENNSYLVANIA.

VEHICLE-BRAKE.

SPECIFICATION forming part of Letters Patent No. 656,375, dated August 21, 1900.

Application filed May 9, 1900. Serial No. 16,019. (No model.)

*To all whom it may concern:*

Be it known that I, JOSEPH WAREN ROGERS, a citizen of the United States, residing at Collomsville, in the county of Lycoming and State of Pennsylvania, have invented certain new and useful Improvements in Vehicle-Brakes; and I do hereby declare that the following is a full, clear, and exact description of the same, reference being had to the annexed drawings, making a part of this specification, and to the letters of reference marked thereon.

The present invention has for its object to provide a simple and effective brake mechanism for wagons and other vehicles that will be easy to control and operate and in which the brake-shoes are brought in frictional contact with the rim of the wheels with increased power and automatically or self-acting with the movement of the horse.
The invention consists in a vehicle-brake constructed substantially as shown in the drawings and hereinafter described and claimed.

Figure 1 of the drawings is a top plan view of the spring-platform gear of a vehicle, showing my improved brake mechanism connected thereto; Fig. 2, a side elevation; Fig. 3, a detail view in perspective of a portion of the brake mechanism; Fig. 4, a detail sectional view of the hanger and its connections, taken on line 4 4 of Fig. 1.

In the accompanying drawings, A represents the frame of a spring-platform gear, and B the axle of a vehicle, upon which axle are mounted the wheels C, the shafts D being pivoted to suitable brackets E through the medium of the clips $a$ or by any other means found best adapted to the purpose, the single-tree F being connected to the cross-bar of the shafts in the usual manner. The brackets E have rigidly connected thereto the outwardly-extending curved arms $b$ and cranks $c$, projecting from the arms, said brackets being pivoted to the plates $d$, which plates are secured to the front end of the side bars $e$ of the frame A. The cranks $c$ connect with the ends of lever-rods G, which rods extend back to similar cranks $f$ upon the curved arms $g$, both the arms and cranks at the front and rear ends of the frame A being of similar construction, as shown more clearly in Fig. 1 of the drawings. The lever-rods G are adjustably connected in any suitably manner to the cranks $c f$, holes $h$ in the cranks being provided for this purpose or any other well-known means found best adapted to the adjustability of the rods, thereby adapting the brake mechanism to the platform-gear of the vehicle. The brake-shoes H I may be of any suitable construction and connected to the arms $c f$, respectively, in any well-known manner, the arms $f$ being pivotally connected to hangers $i$ at the rear end of the frame A or connected in any other convenient manner that will admit of the arms swinging to adapt them to the movement of the pivoted brackets E.

A transverse rod K is pivotally connected to the frame A at the front end thereof and is provided with push-arms L for engaging notches $k$ in the pivoted hangers E when brought in contact therewith to force the brackets outward and release the brake-shoes and keep them off the wheels when the horse is backing. This rod K connects with a suitable foot or other lever M through the medium of the link $l$, said link being loosely connected to the lever and to the crank end $m$ of the rod. Any suitable means may be employed for operating the transverse rod K, and any changes in the details of construction as would come within ordinary mechanical judgment may be made without departing from the principle of the invention.

In the construction of the brake mechanism it will be seen that the forward movement of the shafts D will release the brake-shoes and the backward movement of the shafts will bring the brake-shoes in operative position against the periphery of the wheels, the back brake-shoes I also acting as mud-guards when not in action and when brought in contact with the periphery of the wheels will scrape the mud therefrom and prevent it from adhering to the brake-shoes H.
The hanger $i$ is pivotally connected to depending ears $o$ upon the rear ends of the sides springs N, and the end or transverse springs O of the platform-gear are connected to the hangers $i$ by suitable clips $p$, bolts $r$, and nuts $s$, as shown in detail in Fig. 4 of the drawings. This provides a simple and practical means in the form of a knuckle joint or coupling between the brake-shoe arm and the running-gear of the vehicle, giving to the rear brake-shoe of the spring-platform gear the required motion to insure its effective operation, which is considered of material importance in a brake mechanism of the herein-described character in order to provide a perfect action of the brake at all times.

The invention is applicable to all classes of vehicles, and any change or modification that would come within ordinary mechanical skill may be resorted to without in any manner affecting the essential features of the invention.

Having now fully described my invention, what I claim as new, and desire to secure by Letters Patent, is—

1. In a vehicle-brake, brackets pivotally connecting the shafts with the frame of the running-gear of the vehicle, curved arms connected to the brackets, and brake-shoes connected to the arms, said arms projecting from the sides of the pivoted brackets, substantially as and for the purpose set forth.

2. A vehicle-brake, consisting of suitable pivoted brackets connecting the shafts with the frame or running-gear of the vehicle and formed with notches, curved arms with cranks and brake-shoes on the ends of the arms, and a transverse rod having push-arm to engage the notches in the pivoted brackets, and means for operating the rod, substantially as and for the purpose described.

3. A vehicle-brake, consisting of suitable brake-shoes, curved arms provided with cranks connecting with the shoes, lever-rods connecting the cranks with each other, pivoted brackets connecting the shafts with the frame or platform-gear of the vehicle and also connecting with the curved arms at the front thereof, said brackets having notches, and a transverse pivoted rod with push-arms connected thereto and having cranks at its ends, a suitable foot or other lever and a link connection between the lever and cranks, substantially as and for the purpose specified.

In testimony that I claim the above I have hereunto subscribed my name in the presence of two witnesses.

JOSEPH WAREN ROGERS.

Witnesses:
ANDREW F. MARTIN,
H. H. MARTIN, Jr.